United States Patent Office 3,736,210
Patented May 29, 1973

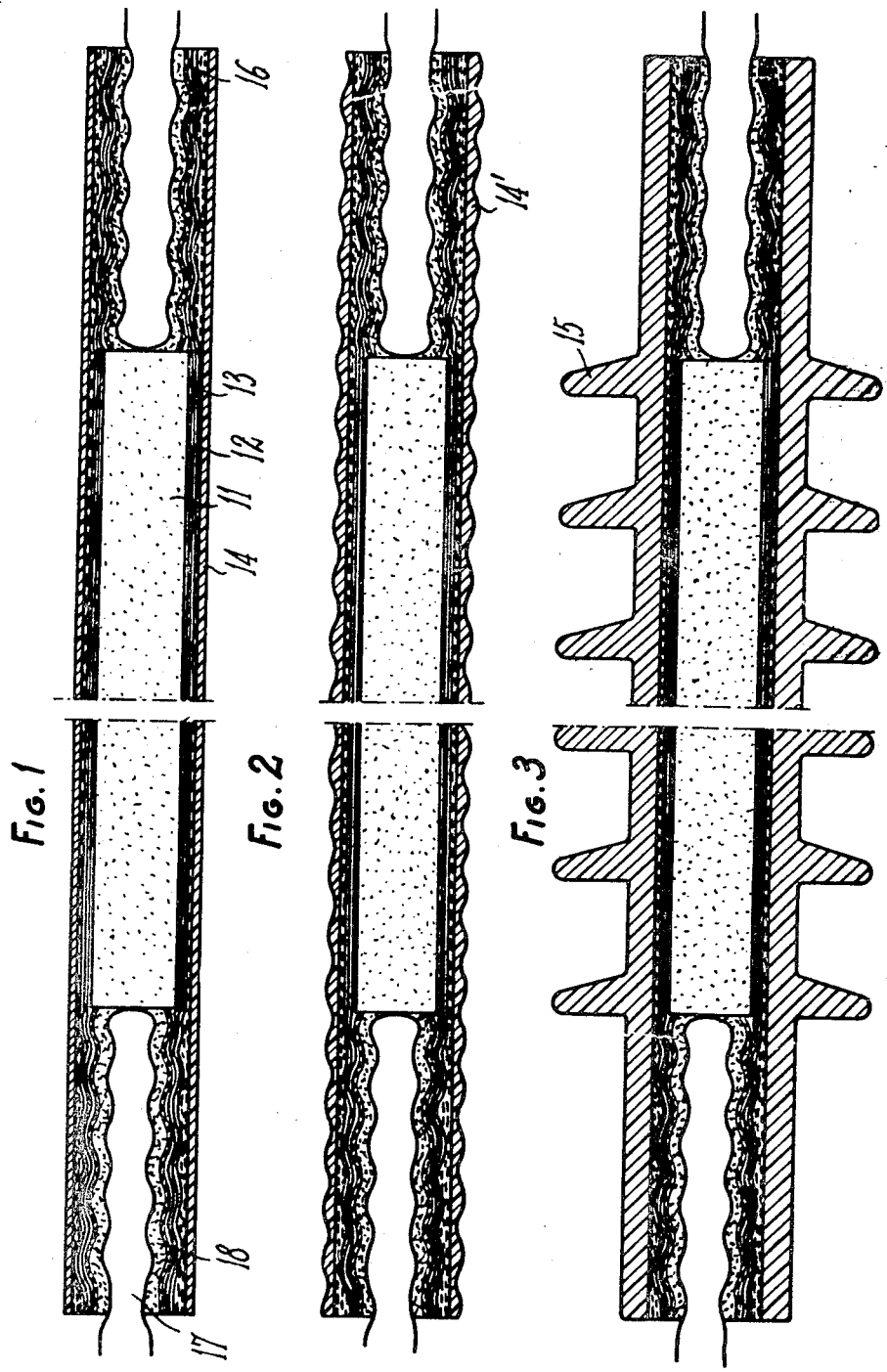

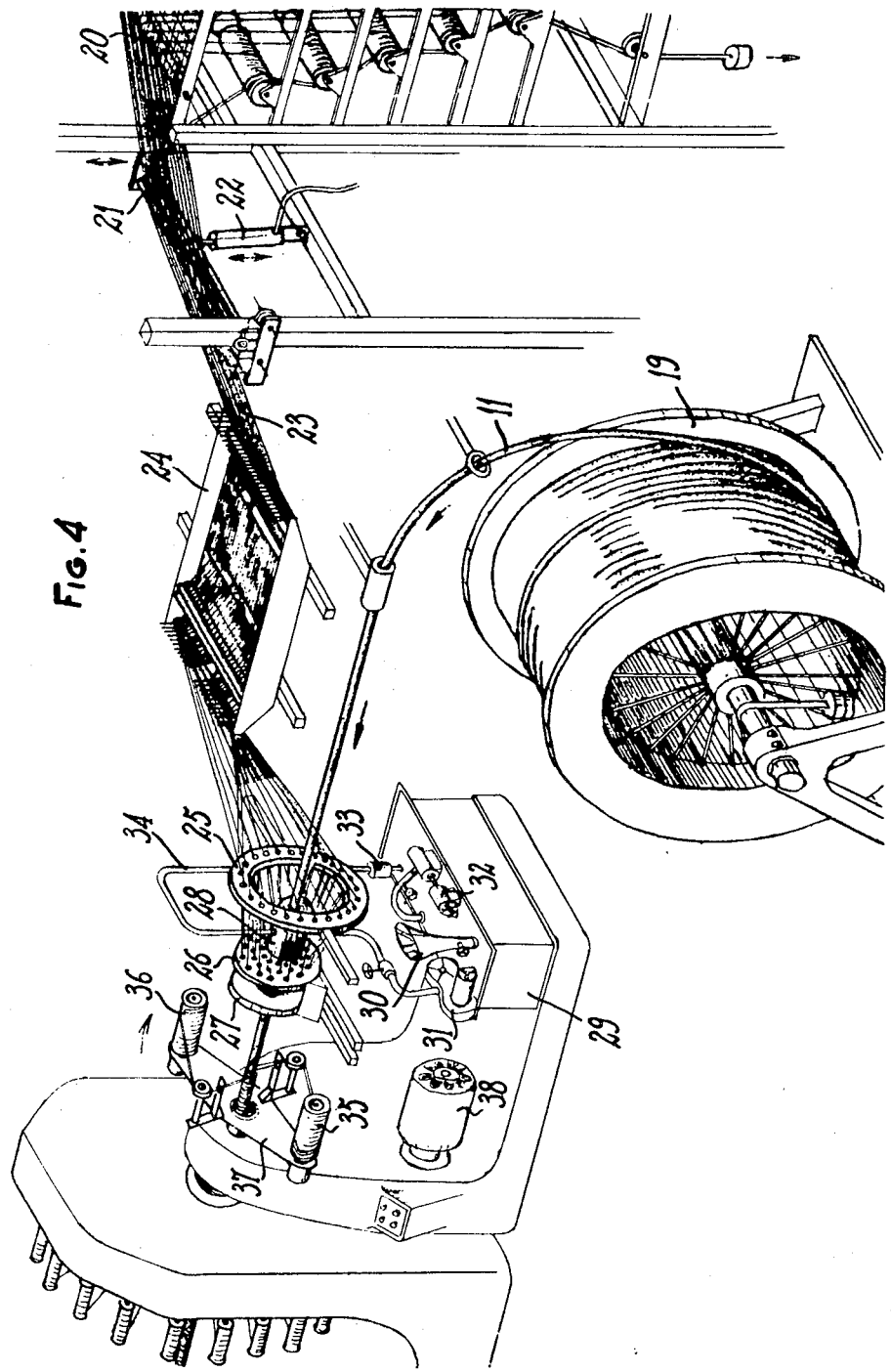

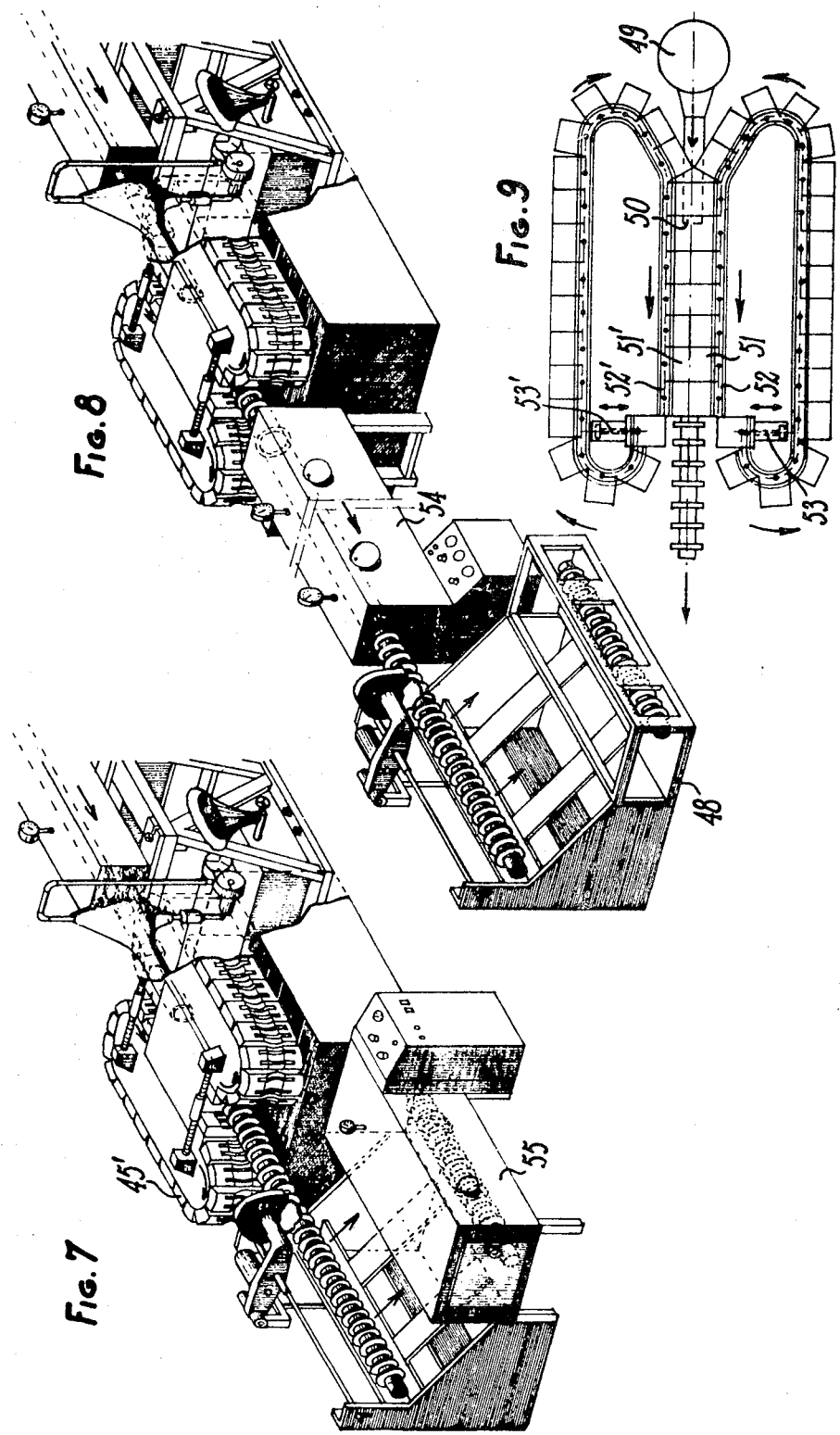

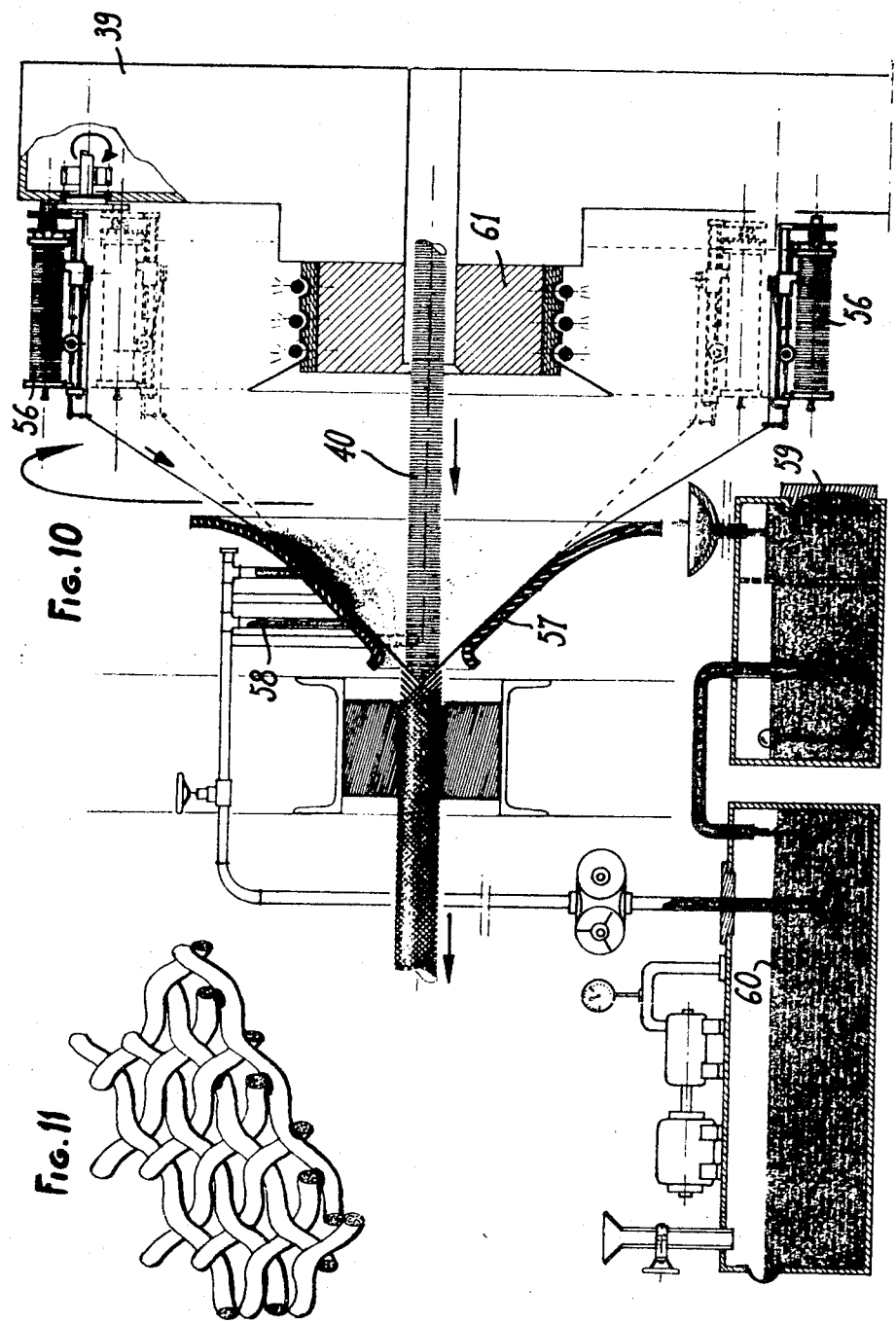

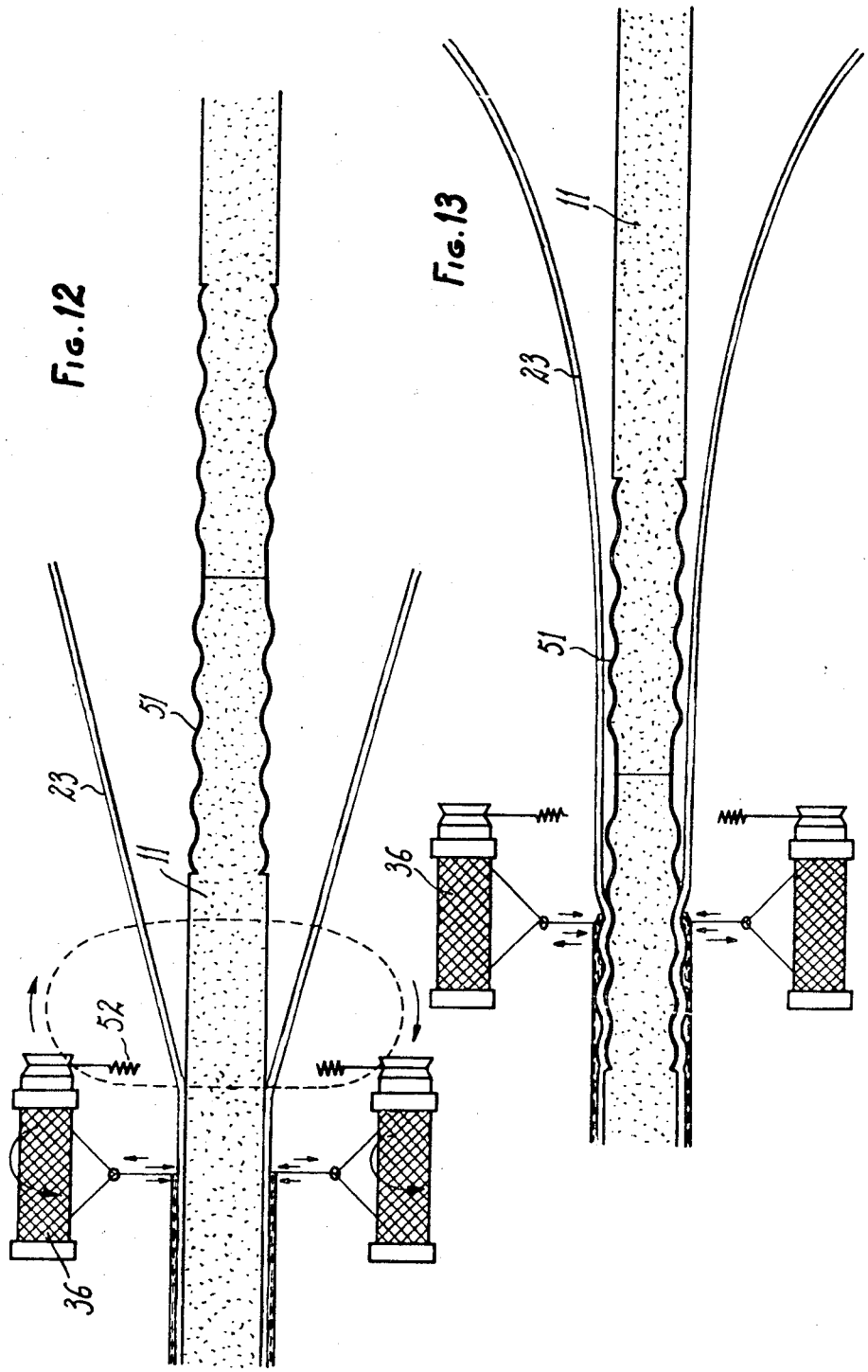

3,736,210
APPARATUS FOR PRODUCING SOLID
ELECTRICAL INSULATORS
Alexandre Kaczerginski, Vichy, Allier, France, assignor to Societe Europeenne d'Isolateurs en Verre Sediver, Paris, France
Original application Oct. 7, 1968, Ser. No. 765,524, now Patent No. 3,567,541. Divided and this application Sept. 16, 1970, Ser. No. 72,731
Claims priority, application France, Oct. 13, 1967, 124,412
Int. Cl. B31c 13/00
U.S. Cl. 156—431                                    5 Claims

ABSTRACT OF THE DISCLOSURE

The continuous production of laminated sections of general cylindrical formation having excellent mechanical and electrical properties to render them especially adapted for use as insulators in electrical transmission networks, and comprising a central core of cellular plastic foam sheathed by one or more layers of resin reenforced with resin-impregnated glass filaments extending longitudinally and circumferentially as well as by an outer relatively thick covering layer of resin, with or without fillers, which is molded before hardening with a smooth cylindrical, fluted or finned outer surface. The invention contemplates the inclusion of anchoring sockets at predetermined spacings along the central core, which, upon severance into individual units, serve for the sealing therein of supporting devices for the units.

---

This is a division of application Ser. No. 765,524, filed Oct. 7, 1968, now Pat. No. 3,567,541.

The present invention relates to sections, particularly to laminated tubes of high mechanical resistance adapted to be used as electromechanical structural elements, especially for insulators in electrical energy transmission lines or high and low voltage distribution systems or networks.

According to one characteristic of the invention, the laminated sections are constituted by a core of cellular plastic foam forming a support, provided with a bracing of reenforced resin, and a surface coating or sheathing of resin of considerable thickness with respect to the cross-sectional dimension of the laminated sections, which sheathing may be smooth, channeled or provided with fins.

According to another characteristic of the invention, the sections or laminated tubes have cavities of definite outline at their extremities, which are adapted to effect anchorage and connection to exterior supports, by any desired sealing or joining expedients.

Besides the advantages derived from the use of synthetic resin, with its particularly favorable electrical characteristics, the sections of the invention have a high mechanical resistance.

The invention also contemplates a method of and an apparatus for the continuous manufacture of laminated sections as described above. This comprises delivering continuously a cellular foam core; forming a sheet of continuous fibers or glass threads impregnated with resin which are directed along the axis of said core; applying this sheet as a reenforcement onto said core; forming a lapping or wrapping on the assembly obtained by means of glass fibers or threads; reimpregnating again with resin; shaping the continuous laminated elements thus attained and initiating the gelification of the resin; and effecting, before the complete hardening of the latter, an application of a thick layer of resin in order to give the final product the desired configuration, for example, flutings or fins, after which hardening of the assembly is completed.

According to the invention, a cellular foam core may be used, the expanding agent of which may be an insulating gas such as Freon ($FCl_3$).

According to another characteristic of the invention, the surface of the foam core is of open cells to favor the anchoring of the reenforcement by improving the junction between the core and the fibers or threads constituting the reenforcement. Furthermore, the impregnation of the surface of the cellular foam core may be executed under vacuum.

According to another important characteristic of the invention, it is arranged that before the application of the sheet of fibers onto the core, a sufficient length of this sheet is disposed to permit perfect distribution of the resin on the fibers by capillary action, this length being principally a function of the speed of travel of the fibers and of the viscosity of the resin.

According to the invention, a peripheral hooping on the reenforcement of the cellular foam core is applied by winding continuous fibers or threads under tension, before the application of the lapping or wrapping.

According to another characteristic of the invention the lapping or wrapping is effected by means of a woven tape in order to prevent the destruction of the transverse reenforcement by friction during the shaping of the element being produced.

According to the invention, the threads or fibers serving for the wrapping are impregnated with resin after leaving the bobbins on which they are stored, and before final application of the woven part of the assembly previously obtained.

According to still another characteristic of the invention, the reimpregnation of the laminated element obtained after wrapping is effected under vacuum, or by immersion in a resin bath so as to avoid any exposure to air before the shaping operation. Thus, natural degassing is assured.

Another important characteristic of the invention resides in the continuous production of sections or laminated tubes provided with cavities designed for anchorage, which may be done by attaching anchoring sockets of the selected section to the cellular foam core at predetermined spacings as the latter advances continuously.

Other characteristics and advantages of the invention will appear from the following description, in conjunction with the attached drawings, which illustrate several embodiments for the execution thereof, and wherein FIGS. 1 to 3 are longitudinal cross-sections of the laminated structural units or tubes according to the invention fitted with anchoring means and provided with sheathings which are smooth, wavy or fluted, and finned, respectively;

FIG. 4 is a perspective view of a first part of the apparatus in accordance with the invention;

FIG. 7 is a partial view in perspective of a device similar to that of FIG. 5, showing a variant of the device of the invention for the manufacture of sections with peripheral fins;

FIG. 8 is a partial perspective view similar to FIG. 7, showing another arrangement of the final oven for hardening the sections, which is done before cutting the continuous length into separate units;

FIG. 9 is a plan view showing schematically the transverse displacements of the half-molds used for the final shaping of the thick coating of the sections;

FIG. 10 is a detailed view showing in vertical section the means provided for impregnation of the lapping or wrapping fibers;

FIG. 11 is a perspective view on an enlarged scale of the intersecting fibers of the lapping, and illustrates the disadvantages resulting from an impregnation of the fibers after the lapping;

FIGS. 12 and 13 are sectional views showing the application of the reenforcing windings of the glass fibers on the core and longitudinal reenforcing fibers between the anchorings, and on the anchorings, respectively.

Figure 5:
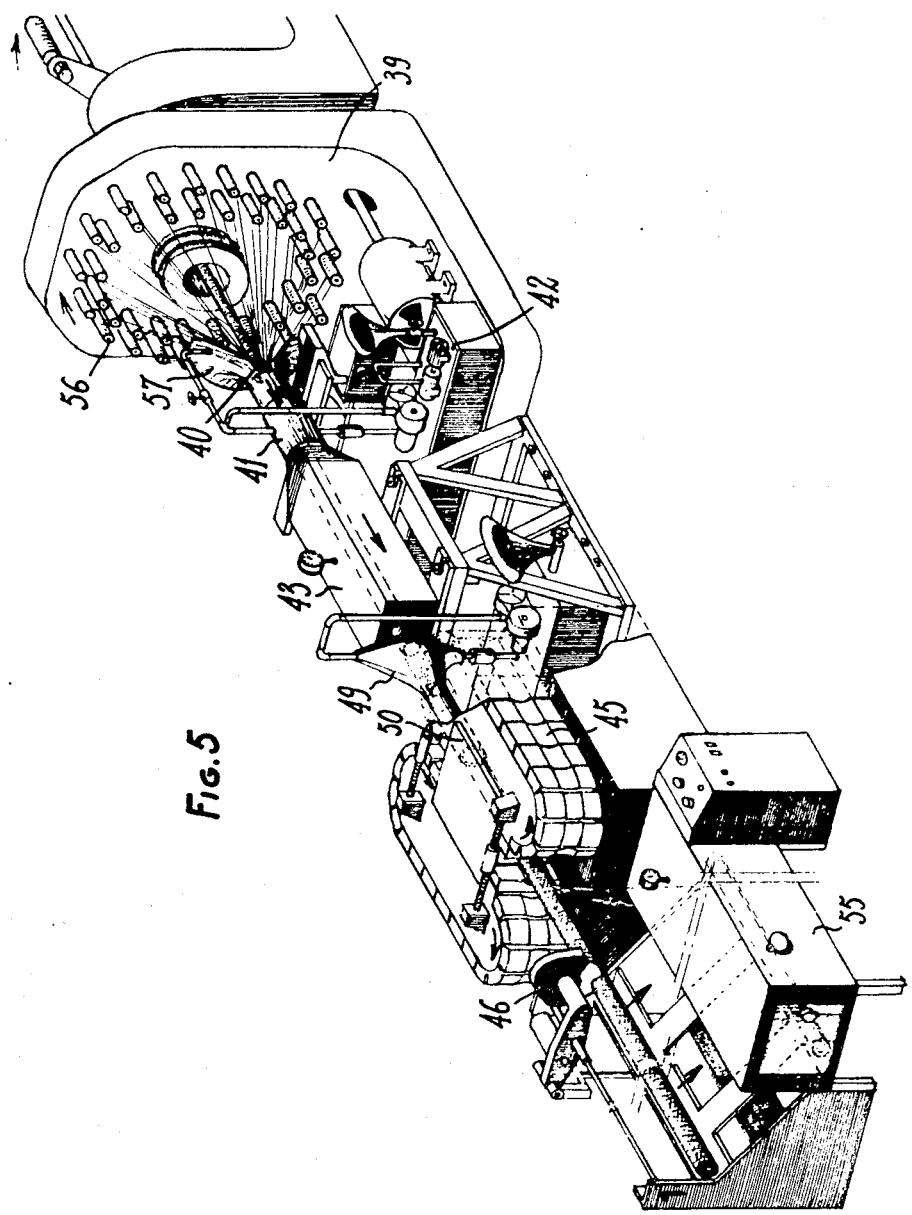
FIG. 5 is a perspective view of the second part of the apparatus which is used for the fabrication of sections with a smooth sheathing.

By referring to FIG. 1 it is seen that a laminated section in accordance with the invention is constituted of a cellular core 11 of plastic foam with closed cells, for example, of polyurethane or phenolic foam. The surface of this foam core is of open cells in order to induce anchoring of the reenforcement by improving the connection between the foam core and the fibers or threads constituting the reenforcement. Advantageously, a cellular foam core, the expansion agent of which is an insulating gas such as Freon, may be used.

In the illustrated example, the reenforcement is composed of glass fibers or threads impregnated with resin, these extending in longitudinal directions at 12 and circumferentially at 13. It is within the purview of the invention to attain this reenforcement by means of helicoidal or spirally wound fibers or even pads, mats, screens or tapes.

Circumferential and longitudinal reenforcing layers may also be used in variable number and sequence in dependence upon the use to be made of the resultant product. The invention provides especially for the attainment of a sheathing constituted by the following successive layers:

(a) a first circumferential layer or a woven tape or band,
(b) a second longitudinal layer,
(c) a third circumferential layer or a woven tape or band, and
(d) a fourth woven or braided layer.

The section comprises finally a covering or sheathing surface 14 of resin of great thickness relative to the cross-sectional dimension of the main body of the section. This coating may advantageously have a polished appearance. It may be smooth, as shown in FIG. 1, or even undulated or fluted, as shown at 14' in FIG. 2, or it may comprise flanges or fins, as shown at 15 in FIG. 3.

By way of example, the invention contemplates for a cellular core of 30 mm. diameter, a sheathing having a thickness of from 2 mm. to 10 mm.

Advantageously, the resin of this thick surface-sheathing will comprise fillers such as, for example, silica, alumina, or artificial fibers.

The external sheathing of resin containing fillers imparts the following insulating properties to the structures: (a) good behavior in guiding the electric arc, without carbonization, a principal property of fillers such as alumina, silica, etc.; (b) excellent thermal behavior under the effect of the power arc at very high voltage and very strong intensity; (c) excellent behavior in aging; the sheathing of resin with fillers forming an opaque screen to ultraviolet rays, the interior reenforcement of impregnated fibers no longer being subjected to the action of these rays, assured good mechanical behavior of the structure in time; and (d) mechanical protection under shock, avoiding the deterioration of fibers subjected to humidity.

As will be explained in the course of the description of the apparatus for their fabrication, the sections are provided at their ends with anchoring cavities, which make possible their connection to the exterior supports, especially when they are utilized as insulators. Each of these anchorings may be constituted by a socket 16, fluted, for example, in which an end shaft-rod 17 is placed and fixed to the socket by means of sealing material 18.

The anchoring sockets which assume any desired outline, for example, with flutings of different shapes such as circular, trapezoidal, bi-conic, di-symmetric, etc., may be formed, as shown in FIGS. 1 to 3, end to end to portions of cellular core 11, as shown in FIGS. 1 to 3, or they may be affixed on the core at predetermined spaced intervals depending upon the intended use.

FIGS. 4 and 5 show an embodiment of the invention for the continuous production of laminated sections of the type shown in FIGS. 1 to 3.

Cellular foam core 11 is wound on a reel 19 where it is mounted in any suitable fashion for supplying the apparatus continuously. The threads or fibers which are to constitute the reenforcement of core 11 are stored on the bobbins of a frame or gallery 20. They are separated longitudinally by a horizontal comb 21 which is movable in a vertical direction by means of a jack-screw 22 which permits regulation of the tension of the sheet of fibers 23. This sheet 23 is impregnated with resin by passing into a vat 24, or similar device, with possibly a preliminary heating of the fibers. The sheet of fibers or filaments, impregnated with resin in vat 24, passes across two thread guides 25 and 26; then into a shaper 27, which as explained below, produces a sheathing of longitudinal fibers on the core.

Cellular core 11, delivered in continuous fashion from reel 19, is impregnated with resin at an impregnation station 28. Should the occasion require, this impregnation of the surface of the cellular foam core may be effected by the same resin as that of impregnation vat 24 for the fibers constituting sheet 23. This impregnation preferably takes place under vacuum. The application of the surface of the cellular core to a vacuum results in the elimination of adjacent air under the resin sheathing, which leads to a complete mechanical anchorage of the laminated part on the exterior surface of core 11, and avoids risks of inhibition of the polymerization of the surface resin through presence of humidity of the air in the open cells on the surface of this core.

The means for impregnating the core with resin have been shown schematically in the drawings. They comprise particularly a resin storage vat 29 provided with a filling orifice 30, a pump 31 for the resin, a vacuum pump 32, and a check valve 33 on the resin feed conduit 34 of station 28 for impregnating the core.

Core 11, after impregnation at 28, is provided with a sheathing of impregnated fibers by shaper 27. This sheathing may be constituted by longitudinal fibers or filaments, as in the case under consideration, or by circular or spiral fibers, or by means of pads, felts, screens or tapes. This sheathing may also be prefabricated before application, or may be manufactured in situ. In order to obtain perfect distribution of the resin impregnating the fibers by capillary action, it is advantageous to give them a sufficiently long free run before they are conducted into the shaper 27, this length being particularly a function of the speed of travel of the fibers and the viscosity of the resin.

After application of the impregnated longitudinal fibers at station 27, a peripheral hooping may be practiced. Either a dry winding may be applied with re-impregnation of resin in the intermediate part before application on the longitudinal layer, or bobbins of pre-impregnated fibers may be utilized. One or more identical superposed layers may be applied.

In the embodiment shown in the drawing, this peripheral hooping is attained with pre-impregnated fibers stored on bobbins 35, 36 mounted on a frame 37 which is rotated by motor 38. At this stage, the cellular core 11 is therefore provided with a reenforcement constituted by longitudinal fibers impregnated with resin, and possibly maintained by peripheral hooping or circumferential winding.

At the following stage shown in FIG. 5, the lapping or wrapping of the assembly of core and reenforcement therefor is executed. This operation is accomplished by means of glass fibers or threads woven on a classic braider or plaiter 39. The reenforcement produced in this manner makes possible a good slipping of the shallow layer of the section thus obtained at the interior of a spinning nozzle of given profile located at a subsequent station.

With a view to obtaining good impregnation of the fibers or threads adapted to produce the woven or braided cover forming the last layer of the reenforcement of the tube or section, it is necessary to provide an impregnation device in contact with the fibers or woven threads. This device according to the invention is located in the zone comprised between the exit of the spindles of plaiter 39, these spindles being activated by a rotary movement along two opposite sinusoidal trajectories, and the top of the cone formed by the different fibers at the moment of final weaving on the laminated tube 40 which is actuated by a continuous translating movement.

This device, shown in FIGS. 5 and 10, is composed essentially of a surface of revolution of generally trunconic or hyperboloid form 57 having a smooth inner surface. This smooth interior surface of the platen has an angle at the top adapted to the one defined by the fibers during weaving, in such a way that the fibers remain continually in contact with the inner surface of the impregnation cone. Impregnation of the fibers takes place in the zone of contact by virtue of the continuous supplying of resin through orifices 58 in this surface. This resin is recovered after impregnation of the fibers delivered by spindles 56, then conducted into a decanting vat 59, then into a storage vat 60 where it is pumped to supply platen 57. The slipping of the fibers over this surface 57 coated with resin permits excellent impregnation of the fibers when they pass into this zone. The resin which is used may be the same as that of the other stations.

In order to improve the impregnation of the fibers during their passage into the impregnation zone, a heating device 61 for the bobbins of fibers and spindles may be used. In this way the glass fibers at the exit from the spindles are free of humidity, and at an adapted temperature which encourages their wetting by lowering the viscosity of the resin (this temperature is governed by different factors such as reactivity of the resin, temperature of gelification, and length of life).

This arrangement according to the invention permits the use of non-impregnated fibers or threads on the spindles of the plaiter, the mechanism of which is very delicate. The use of resin-impregnated fibers would run the risk of causing numerous incidents and malfunctions during fabrication. This is why it is necessary to effect the impregnation after the exit of the fibers from the plaiter. However, it is possible to use bobbins of pre-impregnated fibers, but this gives rise to a substantially higher cost.

The impregnation before executing the final plaiting assures a perfect impregnation because in the case where this impregnation would be effected after plaiting, there arises the risk of imprisoning the air enclosed in the fibers (see FIG. 11), particularly in the zones of contact, by superposition of the fibers crossed during plaiting while they are under tension.

Instead of a woven cover, a woven tape or glass screen may be applied as a covering, which avoids destruction of the transverse reenforcement by friction on the walls of this spinneret, in the case where the superficial or shallow layer is attained by a winding which does not extend longitudinally.

The section 40, thus provided with its reenforcement, is introduced into a vat 41 (FIG. 5), preferably under vacuum, and containing the same resin as that having served to impregnate the cellular core at station 28. The means for supplying vat 41 with resin, designated as an assembly 42, are identical to those described above which supply station 28. This re-impregnation with resin permits the maintenance of the impregnated section in a liquid environment, which insulates it from the atmosphere, thus avoiding the entry of additional air, and effects the evacuation of occluded gas, by reason of the temperature. In the case of the formation of bubbles, it is possible to eliminate them by putting them under artificial vacuum.

After reimpregnation under vacuum, the section thus obtained is introduced into a spinneret 43, which is designed to effect a pre-polymerization, which gives it its definite shape and allows the resin to gellify.

The gellified and not yet hardened section (FIGS. 5 and 7), upon leaving the fabricating spinneret 43, passes into an injection device 49 in the form of a proportioning pump, which feeds a mixture of the same resin as that having served for reimpregnation at 41, but filled preferably with silica, alumina, synthetic fiber, etc., in order to form a thick surface sheathing on the reenforced section. This injection device 49 comprises an annular injection ferrule 50 through which the section passes.

The section is then continuously extracted by a drawing-out device which permits the complete carrying away of the entire chain. This device is designed to confer to the resultant product an excellent surface condition, smooth and polished, which is obtained directly without complementary operations or repairing, such as by modifying or varnishing the section, or by the use of a separable film, as in known processes.

For this purpose, the invention provides a shaping apparatus, which may be designated a spinneret, which suppresses all slipping between the impregnated section and the wall of the spinneret, without interposition of a strippable film. This result is obtained by effecting a longitudinal displacement of the spinneret walls at the same speed as the displacement of the impregnated section. These walls have the reverse or negative contours of the desired section, and are brought to a temperature which permits the execution of the gellification or beginning of hardening of the section, so that the forcible advance can be effected without deforming the section.

The embodiment of the apparatus shown in FIGS. 5, 7 to 9 is composed essentially of opposed caterpillars 45 in planes which form a vertical junction, and the runners of which are constituted by articulated half-shells which are jointed in operative position along a rectilinear section. A continuous translating movement of the caterpillars is obtained by rotation of the cylinders in engagement with the caterpillar components so that the working surface of the half-shells, which are of nonadhering materials, having a polished surface, reproduce this surface condition on the laminated section at the end of the operation.

The section which is produced may have a smooth sheathing, as shown in FIG. 1, or may have a fluted, wavy or flanged sheathing with fins, as shown in FIGS. 2 and 3. In the latter case, the appropriate contour is imparted to the jointed half-shells constituting the caterpillars 45. In the embodiment shown in FIGS. 7 to 9, the half-shells of caterpillars 45 impart the shape of fins to the final sheathing of the section, as illustrated in the section shown in FIG. 3. As described above, this caterpillar assembly also permits the entire advance of the whole chain.

FIG. 9 shows an arrangement of a mechanism for effecting the movements of the half-shells of caterpillars 45. The annular injection ferrule 50 of the injection device 49 is indicated in this FIG. 9. The caterpillars comprise a number of half-shells, such as 51, 51′, between which the section with its thick resin coating passes through ferrule 50.

In the case where it is desired to obtain a section having a sheathing with fins, the removal of the latter from the mold requires an additional mechanism, permitting removal by lateral extraction, so as to avoid breaking through deformation of the hardened covering. For this purpose, the invention provides means separating the half-shells 51 and 51′, respectively, in a movement which is perpendicular to the direction of advance of the section being produced. In this embodiment each half-shell 51 and 51′ is provided at its base with a groove 52, 52′, respectively, or the like, in which a jack screw 53, 53′, respectively, or any other suitable means, is in engagement. The half-shells are thus separated at the exit end of the caterpillar assembly by a movement in a transverse direction relative to the axis of the advancing section.

In the case where it is desired to obtain only smooth or fluted sections, an assembly of caterpillar bands having the contours of the desired section may be provided. This continuous band may be made of elastomers with textile reenforcement, for example, rubber, silicone or fluorite, having the anti-adherent and thermal resistant properties necessary for this fabrication.

The product is in the hardened state at the outlet of the caterpillar assembly, but is not completely polymerized. It is then necessary to have it pass into a stove to finish its hardening. It is possible to effect the hardening of the section following its exit from the caterpillar assembly 45 in a heat-regulating stove 54, as shown in FIG. 8. Thereafter it may be cut to the desired length after its exit from the stove, which leads to obtaining, at the end of the chain, the product in its final state, with essentially the anchoring cavities as explained later. On the other hand, the section may be cut in the desired lengths directly upon leaving the caterpillar assembly in a semi-hardened state, as indicated in FIGS. 5 and 7, and these unitary pieces may then be set into a stove 55 where complete hardening of the pieces is accomplished. This second solution reduces the length of the chain of fabrication and introduces more flexibility in the manufacture.

The laminated sections or tubes of high mechanical resistance to tensile and bending stresses thus attained, when they are designed to be used as elements of electromechanical structures, should possess, preferably at their extremities, means for attaching, anchoring or effecting their connection to exterior supports.

One of the embodiments of the invention provides for the continuous production of reenforced sections such as described above fitted with anchoring cavities at their ends.

Figure 6:
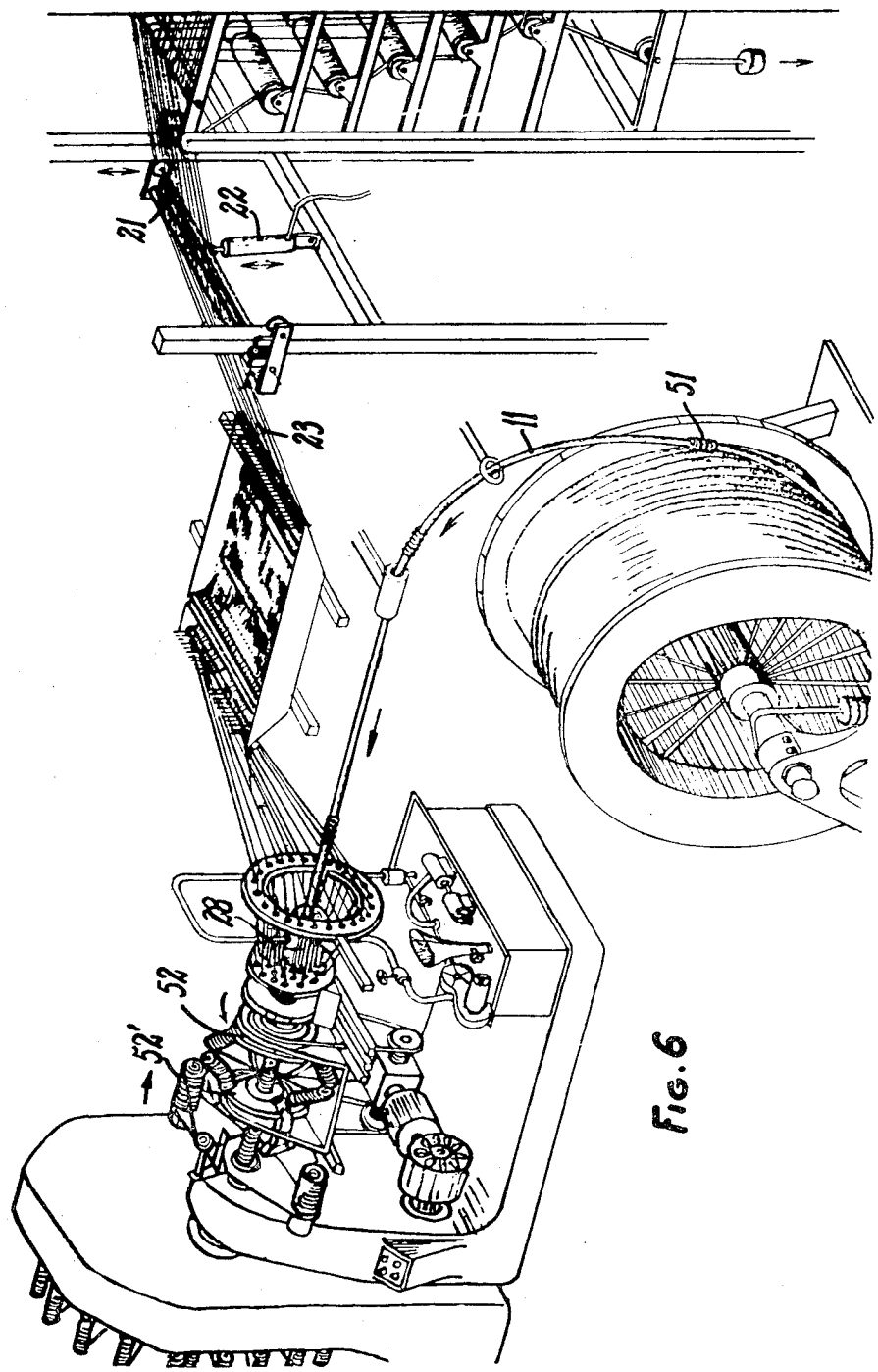
FIG. 6 is a perspective view of a variant embodiment of that shown in FIG. 4, which is designed for the fabrication of sections provided with anchoring means.

FIG. 6 illustrates an embodiment of the invention similar to that shown in FIG. 4, for continuously producing laminated sections provided with anchoring cavities. In this example anchoring sleeves 51 having the desired shape, for example, with circular, trapezoidal, biconic, disymmetrical fluting, are attached to the core 11 of cellular foam at predetermined displacements dependent upon the intended use of the units. The anchoring sleeves may be of deformable materials, for example, elastic material but with a rigid inner socket, or of fusible or soluble materials, which may be extracted after the attainment of the final shape. Preferably, they will be constituted by a metallic band of non-ferrous alloy, such as copper, brass, etc., the exterior shape of which may be attained in mass production by stamping, punching, or injection molding.

The material is selected so that it has substantially the same coefficient of expansion as that of the material constituting the section in which it remains in place. These anchoring rings may be either invisible, by being left in place and thereby defining the inner shape of the anchoring cavity of the section, which avoids direct contact between the laminated section and the sealing sleeve which effects the anchoring; or they may be destructible after the anchoring cavity of the section is obtained. The latter may be attained by the use of thermoplastic materials either of low melting point alloys, or brass, thin aluminum, provided with means to start the breaking.

Instead of being fastened on the cellular foam core, the anchoring sleeves may be joined to the respective extremities of portions of predetermined length of this core, the assembly thus obtained being wound on a reel or similar device. The continuous assembly thus formed by the cellular foam core with the sleeves constituting the anchoring cavities, follows the same manufacturing procedure as the foam core which is not provided with anchorings, as shown in FIGS. 4 and 5, by passage to the impregnation station of the core 28, followed by passage into the shaper or conformer 27. The section provided with its reenforcement of impregnated longitudinal fibers then passes to the station for circumferential winding. Deformation of the longitudinal fibers under the effect of pressure arising from the circumferential hooping causes the longitudinal fibers to conform closely to the shape of the surface outlined by the anchoring sleeve.

However, due to the tension of the longitudinal fibers during manufacture of the cylindrical part of the tube, this deformation is difficult to attain, which causes a relaxation of the longitudinal fibers in the anchoring flutes of the sleeve during the application of the circumferential hooping. Accordingly, this relaxation operation of the longitudinal fibers at the time that winding or hooping is applied to the anchoring sleeves is attained by a device situated between the fiber-supporting frame and the impregnation vat. This device, in this example, is simply constituted by a movable comb 21 driven by a jack 22. This jack 22 by moving upward increases the tension of the longitudinal sheet of fibers 23, and inversely, its downward movement decreases this tension of the fibers either totally, or partially.

A remote control may be provided for the jack 22, which may be controlled by a proximity detector which is actuated, for example, by a metallic mass, upon the incidence of an anchoring sleeve. There may also be provided a remote control for the jack 22 which is responsive to a constant linear function of the desired length of the elements. This remote control may also act on the circumferential hooping device by (a) modifying the circumferential winding speed so as to fill the anchoring cavities which require a great number of fibers, and thus may also be provided a second double circumferential winding acting in the opposite direction, as shown at 52' in FIG. 6; (b) actuating the auxiliary brake of the bobbins of circumferential fibers, in order to increase their tension to permit the conforming or shaping of the longitudinal fibers; and (c) re-establishing normal fabricating conditions after passage of the anchoring sleeve, by the proximity detector reacting in an inverse sense to reduce the speed and tension of the circumferential winding and to impose the necessary tension on the longitudinal fibers.

FIGS. 12 and 13 illustrate schematically how the winding is executed between the anchoring and on the anchoring devices.

In FIG. 12 is shown core 11, on which are fastened, at predetermined intervals, the anchoring sleeves or sockets 51, which in this case are of the fluted type. As described above, the longitudinal fibers of reenforcement are shown at 23, and the bobbins used for the circumferential hooping of this reenforcement are shown at 36. FIG. 12 illustrates the stage of fabrication whereat is executed the circumferential hooping of the part of the section between the anchorings. As explained above, the longitudinal fibers are normally stretched taut and the circumferential hooping is executed at low tension and reduced speed, bobbins 36 being provided with auxiliary brakes such as 52. When the proximity detector reacts to the presence of anchoring sleeve 51 (FIG. 13), the remote control acts on jack 22 (FIG. 6) of the tension control device of the longitudinal fibers, so as to slacken these fibers longitudinally, and, at the same time, auxiliary brakes 52 are actuated to increase the tension of the threads or fibers issuing from bobbins 36 for the circumferential hooping. A deformation of the longitudinal fibers results under the stress of winding the circumferential fibers delivered from the bobbins 36 under strong tension and high speed, while the longitudinal fibers are very slightly stretched. In this way, the deformation of the longitudinal fibers under the effect of pressure of the circumferential hooping influences the longitudinal fibers to conform exactly to the shape of the external surface of the anchoring sleeve.

After hardening, the metallic connecting pieces are sealed within the anchoring cavities, according to known processes.

It is thus seen that by the arrangements in accordance with the invention it is possible to produce, in absolutely automatic and continuous fashion, laminated sections or tubes having high mechanical resistance, provided especially for use as electromechanical structural elements, these sections also being provided with end anchoring cavities.

Among the advantages of the invention may be cited: continuous fabrication; elimination of any need for separating films; smooth appearance resembling a directly polished surface, without any additional operations; possibilities of production of tubes having surfaces which may be smooth, fluted or finned; possibilities of producing thick sheathings of resin with fillers; and the obtention of a sheathing of resin with fillers having excellent connection with the supporting tube, forming a mechanical reenforcement, by reason of the use of identical resins, and an almost simultaneous hardening which assures good bond between the layers.

It is, of course, understood that the invention is not limited to the specific embodiments and methods of production described and shown, but that it includes all variants.

I claim:

1. An apparatus for producing solid electrical insulators having high load-bearing capabilities, comprising
   (a) means for feeding continuously a solid cylindrical core of cellular plastic material with anchoring sockets of fluted contour affixed thereto at predetermined spaced intervals, by the advancing movement of the core at the outlet of the apparatus,
   (b) a bobbin frame for supplying a plurality of glass threads,
   (c) comb means for aligning the threads issuing from the bobbins,
   (d) means for impregnating the threads with a polymerizable organic resin,
   (e) means for guiding the impregnated threads longitudinally adjacent and parallel to said travelling core in surrounding relation thereto,
   (f) adjusting means forming part of said comb means to regulate the tension of the longitudinally extending threads applied to said core,
   (g) means for applying and shaping said impregnated threads to said core to form a sheath thereon,
   (h) means for winding continuously at least one additional sheath of glass threads circumferentially of the core and the longitudinally disposed threads thereon,
   (i) control means for said circumferential thread-winding means,
   (j) a detecting device for governing differentially and conjointly the tension of the longitudinally extending threads and said last-mentioned control means as the circumferential thread-winding means operates on the main portion of the cylindrical core and at the anchoring sockets affixed thereto,
   (k) means for preliminarily hardening the synthetic resin in the course of the continuous travel of the core and reenforcements therefor, and
   (l) means for molding a relatively thick layer of an organic resin onto the latter during the continued travel thereof and before its final polymerization.

2. An apparatus as set forth in claim 1, wherein said detecting device operates as a function of the displacement of said anchoring socket along said core.

3. An apparatus as set forth in claim 1, wherein said anchoring sockets are at least partially formed of metal and said detecting device comprises a proximity detector.

4. An apparatus as set forth in claim 1, wherein said detecting device controls the tension of the continuous thread issuing from the circumferential thread-winding means.

5. An apparatus as set forth in claim 1, wherein said detecting device controls the tension of the continuous thread issuing from the circumferential thread-winding means and the winding speed by controlling the auxiliary brakes of the bobbins supplying the circumferential hooping turns.

References Cited

UNITED STATES PATENTS

| | | | |
|---|---|---|---|
| 3,408,241 | 10/1968 | Keyt et al. | 156—432 |
| 3,249,481 | 5/1966 | Boggs | 156—172 |
| 3,068,133 | 12/1962 | Cilker et al. | 156—171 |
| 3,470,051 | 9/1969 | Meyer | 156—172 |

BENJAMIN A. BORCHELT, Primary Examiner

H. J. TUDOR, Assistant Examiner

U.S. Cl. X.R.

156—171; 242—7.21